T. O. HELGERSON.
GRAIN SEPARATOR.
APPLICATION FILED MAR. 17, 1915.

1,336,958.

Patented Apr. 13, 1920.
6 SHEETS—SHEET 5.

Witnesses
A. H. Opsahl.
E. C. Skinkle

Inventor.
Thomas O. Helgerson
By his Attorneys
Williamson Merchant

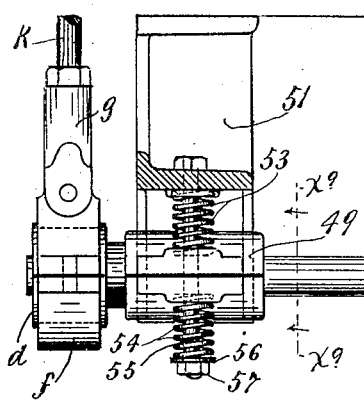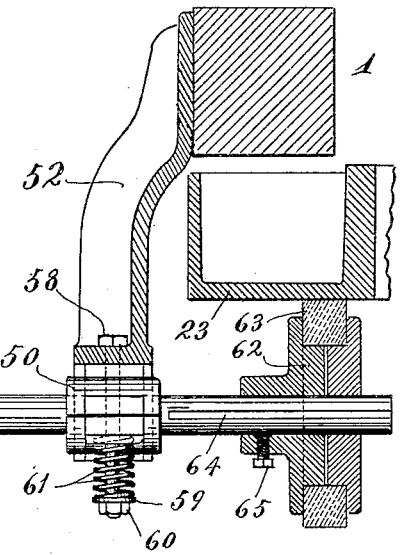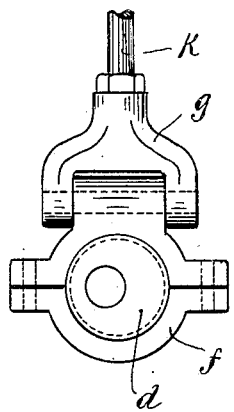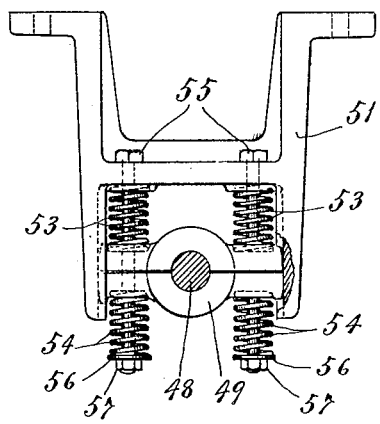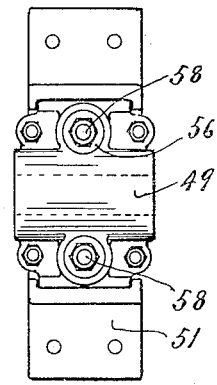

UNITED STATES PATENT OFFICE.

THOMAS O. HELGERSON, OF MINNEAPOLIS, MINNESOTA.

GRAIN-SEPARATOR.

1,336,958.  Specification of Letters Patent.  Patented Apr. 13, 1920.

Application filed March 17, 1915. Serial No. 14,911.

*To all whom it may concern:*

Be it known that I, THOMAS O. HELGERSON, a citizen of the United States, residing at Minneapolis, in the county of Hennepin and State of Minnesota, have invented certain new and useful Improvements in Grain-Separators; and I do hereby declare the following to be a full, clear, and exact description of the invention, such as will enable others skilled in the art to which it appertains to make and use the same.

My present invention relates generally to grain separators, and is directed particularly to the provision of a simple and efficient machine of high capacity and which will meet the requirements for separating commingled wheat and oats, or other grains or materials, in elevators, re-cleaning houses, mills, and the like. Generally stated, the invention consists of the novel devices and combinations of devices hereinafter described and defined in the claims.

A commercial form of the improved separator is illustrated in the accompanying drawings wherein like characters indicate like parts throughout the several views.

Referring to the drawings:

Fig. 8 is a horizontal section taken on the line $x^8$ $x^8$ on Fig. 2, some parts being shown in full;

Fig. 9 is a section taken on the line $x^9$ $x^9$ on Fig. 8;

Fig. 10 is a front elevation of the parts shown at the extreme left of Fig. 8; and Fig. 11 is an elevation of the parts shown in Fig. 9.

Figure 1:
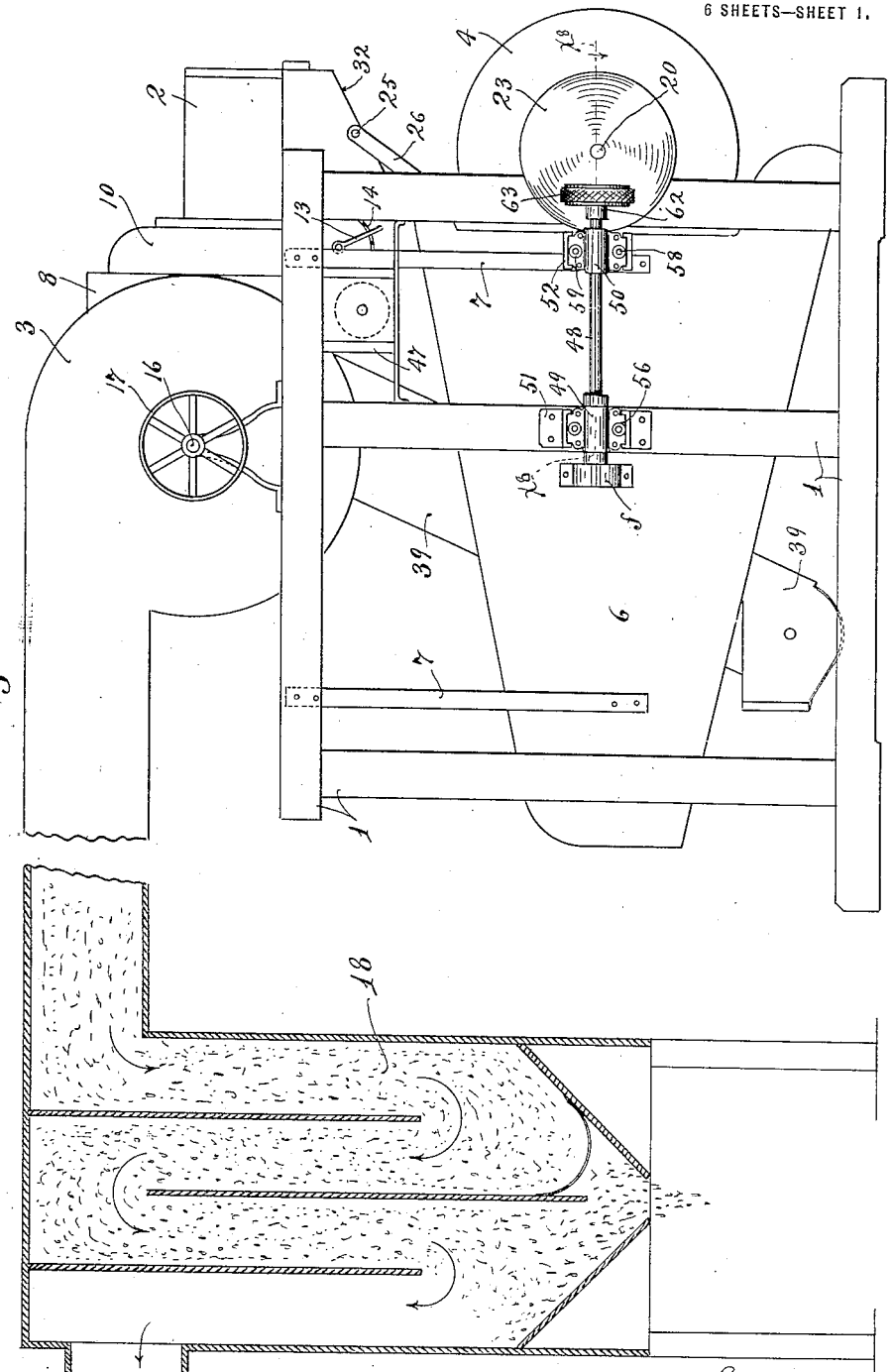
Figure 1 is a view showing in left side elevation, the complete grain separator and showing in vertical section a dust collector which may be used in connection therewith.

The framework 1 of the machine may be of any suitable construction, being, as shown, of a rectangular skeleton form to which are rigidly secured a feed hopper 2 and fan cases 3—3 and 4, and also various other parts which will be hereinafter noted.

A gang of superimposed inclined sieves 5, preferably of the perforated zinc sieve type, are suitably secured in and carried by a large sieve shoe 6 that is open at its bottom and at both ends. This shoe 6 is suitably supported for vibratory movements transversely of the machine, or in other words, transversely of the direction of the travel of the stock over the sieves 5, and, as shown, it is thus supported by metallic anchor straps or links 7, which, at their upper ends, are attached to the top of the frame 1, and at their lower ends are attached to the sides of the said shoe.

The upper fan cases 3 are laterally spaced and, at their inner sides, are formed with large openings that are in direct communication with the suction box or chamber 8 located high above and extended across the sieves 5, and provided with a long transverse intake port 9 that communicates with the upper end of a depending suction spout 10. This suction spout 10, at its lower end, terminates immediately above an underlying table 11 carried by the shoe 6, and from which, as shown, the uppermost sieve 5 extends downward and rearward. Within the suction spout 10 is a suction regulating valve or pivoted gate 12. The valve 12, as shown, is provided at its outer end with a spring arm 13 engageable with a notch segment 14 on the outer side of the spout to hold said valve in different adjustments.

Working within the fan cases 3 are fan heads 15 secured on a fan shaft 16 journaled in suitable bearings on the frame 1 and provided at one projecting end with a pulley 17. The discharge spouts of the fan cases 3 are preferably connected to a dust collector 18 of suitable construction.

The fan case 4 opens for discharge of air directly into the large front end of the shoe 6 and working therein, is a fan head 19 secured on a shaft 20 journaled in suitable bearings on the frame 1 and provided at one projecting end with a small pulley 21 and a larger pulley 22, and provided at its other projecting end with a face friction wheel or disk 23.

Figure 3:
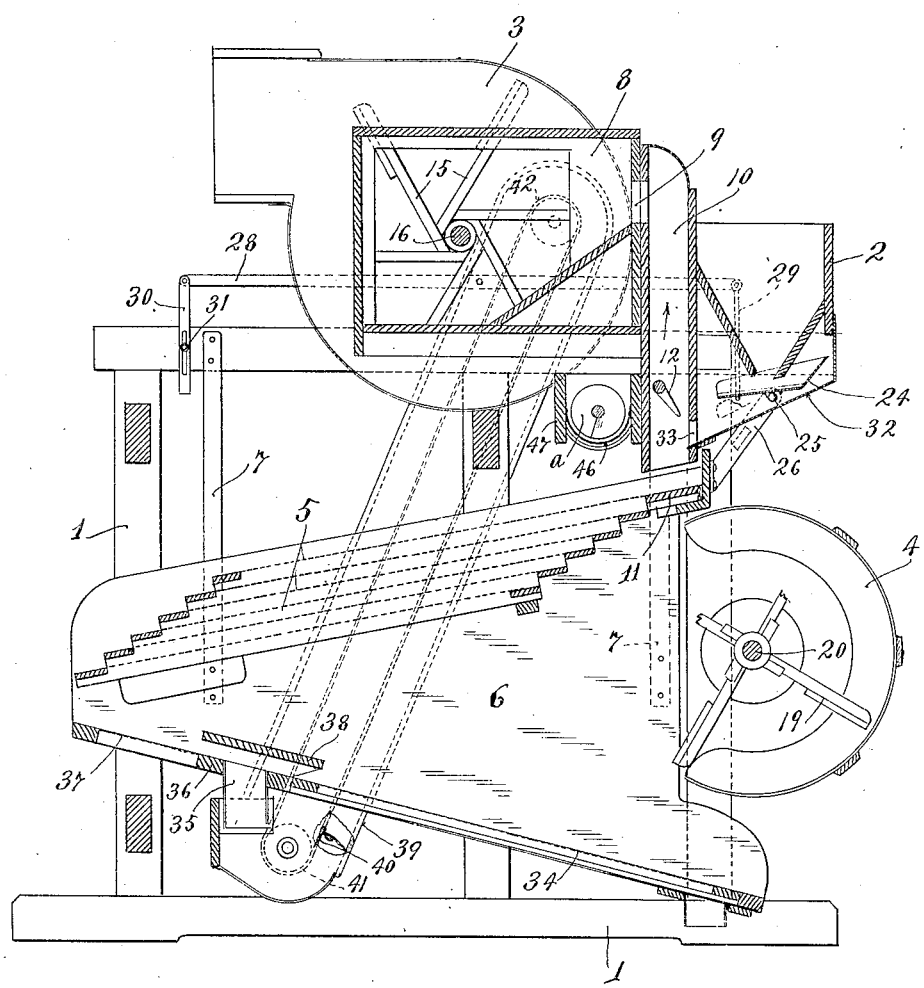
Fig. 3 is a vertical section taken on the line $x^3$ $x^3$ on Fig. 2.
Figure 4:
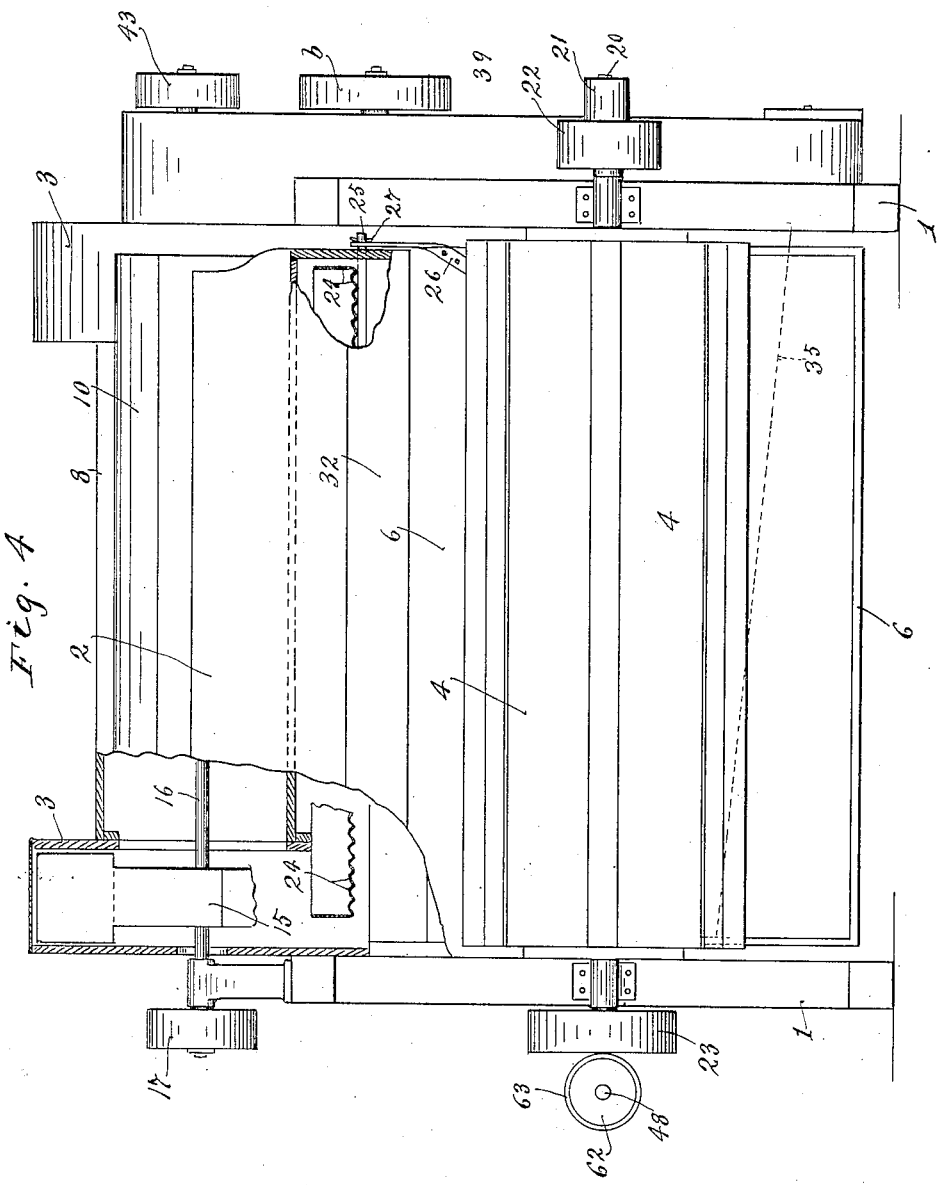
Fig. 4 is a front elevation of the separator, some parts being broken away and some parts being sectioned.

Located below and receiving the stock from an opening in the bottom of the hopper 2 is a feed pan 24 that is secured to a rod 25, the ends of which project through the depending sides of the hopper 2 and are pivoted in supporting arms 26 carried by the upper end of the vibratory shoe 6. Cotters 27, or other suitable device (see Fig. 4) cause the rod 25, and hence the pan 24, to partake of the vibratory movements of the shoe 6 transversely of the machine. The passage in the bottom of the hopper 2 is of approximately the same width as the sieves 5, and the pan 24 extends completely under and slightly beyond the ends of said discharge passage. The bottom of the pan is corrugated, and the corrugations thereof run longitudinally of the machine, or in the direction of the travel of the stock over the said pan. Stated in another way, the said corrugations extend in a direction at a right angle to the direction of the vibration of the said feed pan and of the sieves and shoe. The feed pan is adapted to be seated either in a horizontal position or inclined at different angles, and preferably, this is accomplished by means indicated in Fig. 3, wherein the numeral 28 indicates a long light lever intermediately pivoted to a suitably fixed part of the machine, and connected at its front end to one end of the feed pan 24, by a loosely supported link 29. The front end of the lever 28 is adjustably connected to the framework, as shown, by means of an anchoring link 30 adjustably anchored to the machine frame by means of a slot and bolt connection 31. These devices for adjusting the pan 24 may be applied either on one or on both sides of the machine, at will.

Located below the feed pan 24 and secured to the depending sides of the hopper 2 is a forwardly inclined deck 32 that leads to the passage 33 in the adjacent wall of the suction spout 10. This passage 33 extends completely across the feed spout, so that the flow of stock off from the deck 32 into the spout 10 and from thence onto the feed table 11 of the vibratory shoe, is not restricted by the said passage.

Figure 6:
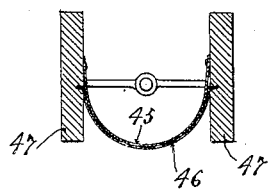
Fig. 6 is a detail taken in section on the line $x^6$ $x^6$ on Fig. 2, but with some parts removed, showing the spout of a so-called redistributer.
Figure 7:
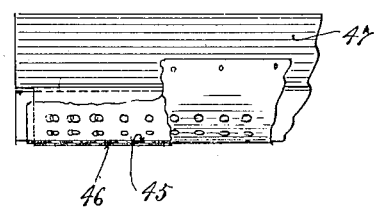
Fig. 7 is a fragmentary view in rear elevation of the spout shown in Fig. 6, some parts being sectioned.

The shoe 6, at its bottom, carries a forwardly inclined sand screen 34 that leads downward from a discharge spout 35 that is also carried by the said shoe. The said discharge spout 35 is preferably located about vertically under the lower portion of the uppermost sieve 5, and it extends from one side to the other of the shoe. The bottom of the shoe is preferably further formed with imperforate deck sections 36 extending slightly in front of and slightly at the rear of the spout 35, and at the rear of this imperforate deck section, the bottom of the shoe is formed with a screen 37. The shoe also carries a raised imperforate deck 38 that overlies the spout 35 and imperforate deck section 36. The bottom of the discharge spout 35 inclines in a direction transversely of the machine, or, otherwise stated, in the direction of the vibration of the sieve shoe, and at its lower end, it delivers into the lower end of an elevator leg 39 supported on one side of the machine frame 1. Working within the elevator leg 39 is an endless bucket-equipped elevator belt 40 which, at its lower portion, runs over a suitable guide roller 41 journaled in the lower end of the said leg, and at its upper portion, runs over a suitable driving roller 42, the shaft of which is journaled in the upper portion of the said elevator leg and projects at one end, and is provided with a pulley 43. At its upper portion, the said elevator leg 39 is provided with a depending discharge spout 44 into which the elevated grain is delivered from the upper portion of the elevator belt 40. This discharge spout 44 delivers into the outer end of a so-called redistributing spout that is supported by the machine frame 1 and extends over the head portion of the uppermost sieve 5. This redistributing spout is preferably made up of two closely engaged semi-cylindrical sheet metal troughs 45 and 46, the former of which is rigidly secured to parallel transverse bars 47 of the machine frame 1, (see particularly Figs. 6 and 7). The lower trough 46 has out-turned flanges that work in slots cut in the bars 47, so that it is free for limited sliding movements in respect to the upper or relatively fixed trough 45. These troughs or sheet metal elements 45 and 46 are formed with elongated perforations or slots that are supplemental, one to the other and are adapted to be brought into full registration or into a reduced registration, so as to produce discharge passages of different size, depending on the character of the stock that is to be re-distributed. Any suitable means for securing the said perforated troughs 45 and 46 in different set positions in respect to each other may be employed, but as shown, this is accomplished by the friction produced between the trough 46 and bars 47, under the outward spring or spreading tension of the said member 46. Working within the redistribution spout is a spiral conveyer $a$.

Vibratory motion is imparted to the sieve shoe through a driving mechanism of novel construction and relative arrangement. This driving mechanism includes a counter shaft 48 that is journaled in yieldingly supported bearings 49 and 50. The bearing 49 is guided for sliding movements between the prongs of a supporting bracket 51 rigidly secured to one of the adjacent posts of the frame work 1, and, likewise, the bearing 50 is mounted for sliding movements between the prongs of a bearing bracket 52 rigidly secured to another post of the said framework. The bearing 49 is yieldingly cushioned in both movements, by inside coiled springs 53 and outside coiled springs 54. Thrust bolts 55 are extended through flanges of the bracket 51, and through perforations in the projecting flanges of the bearing 49, and at their outer ends are, as shown, provided with washers 56 and nuts 57. The said bolts also, of course, pass through the said springs 53 and 54. The springs 53 are compressed between the bracket 51 and the bearing 49, while the springs 54 are compressed between said bearing and the washers 56. Thrust bolts 58 are passed through a flange of the bracket 52, and through flanges of the bearing 50, and, as shown, are provided at their outer ends, with washers 59 and nuts 60. Cushioning springs 61 are placed around the bolts 58 and are compressed between the flanges of the bearing 50 and the said washers 59.

At its front end, the shaft 48 is provided with a peripheral friction wheel 62 that cooperates with the face friction wheel 23 already noted. This friction wheel 62 is of any well known type, but is preferably provided with a fiber friction band 63 that is pressed into frictional engagement with the face of the wheel 23, by the tension of the springs 61. Also, this friction wheel is made axially adjustable on the shaft 48, so as to attain a variable speed transmission. To this end, the said shaft is shown as provided with a long key-way 64 for engagement with a key in the hub of the said friction wheel 62 and the hub of the said friction wheel is further shown as provided with a set screw 65 by means of which it may be locked to the said shaft in different adjustments in respect to the axis of the friction wheel 23.

Figure 2:
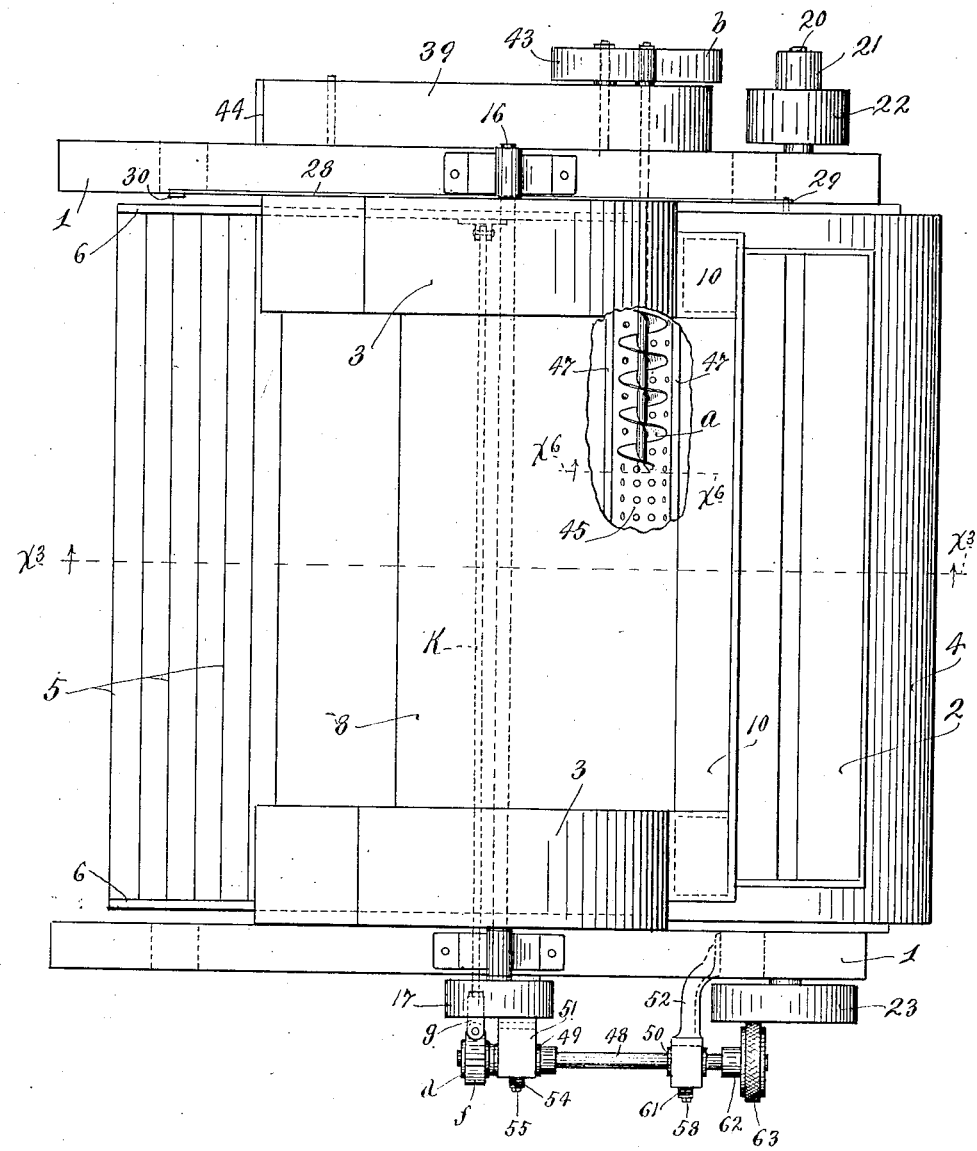
Fig. 2 is a plan view of the separator with some parts broken away.

At its rear end, the shaft 48 carries an eccentric or crank $d$ on which is mounted an eccentric strap $f$ which has a heavy projecting lug to which the head $g$ of a long pitman $k$ is connected by a vertical pivot. This pitman $k$ extends through suitable clearance passages in the sides of the sieve shoe 6 and is pivotally connected to the said sieve shoe at its far side (see Figs. 2, 8 and 10).

Figure 5:
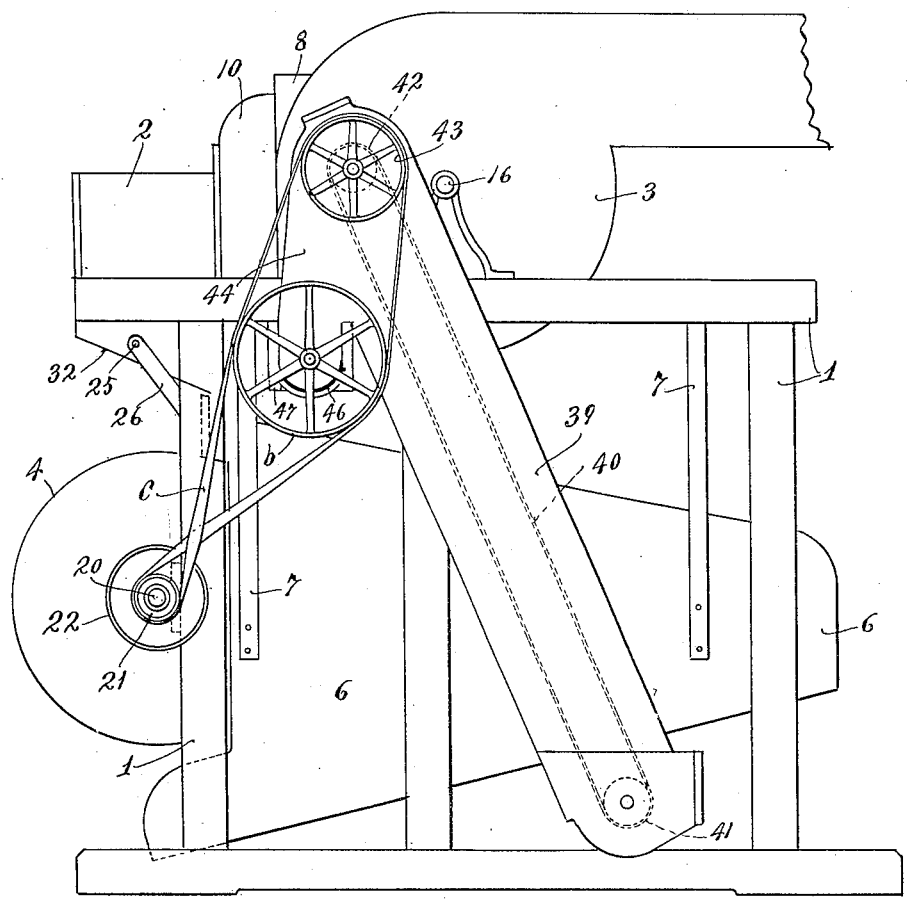
Fig. 5 is a right side elevation of the separator.

The shaft of the spiral conveyer $a$ is journaled in suitable bearings on the frame 1, and at one end has a large pulley $b$. A cross belt $c$ runs over the pulleys 21, 43 and $b$ in the manner illustrated in Fig. 5, so that the spiral conveyer $a$ and the fan heads 15 and 19 are driven from the shaft 20. This fan shaft 20 will be driven from a power belt, not shown, but which will run over the pulley 22. In fact, in the construction illustrated, all of the running parts of the machine are driven from the shaft 20.

*Operation.*

The operation of the improved separator in its use for the separation of wheat from wild and tame oats and other foreign materials, such as small seeds and dirt and chaff, is substantially as follows:

The commingled wheat and oats particularly known as "succotash" will be fed into the hopper 2 in any suitable way, not necessary for the purposes of this case to consider. When the machine is idle, the grain will run onto the feed pan 32 and form a pile which will not, however, run off from the delivery end of the said feed pan. When, however, the machine is in action and the shoe 6 is vibrated transversely of the machine, the commingled grain will be fed off from the lower delivery edge of the said feed pan, and the longitudinal corrugations of said pan will cause a heavy feed from the feed pan from one side or end to the other thereof, thus insuring proper distribution of the delivered grain. The grain thus fed will run in a heavy sheet onto the inclined deck 32, and from thence, through the passage 33 and onto the table or hopper end portion of the uppermost sieve of the gang 5. The fans 15 will create a partial vacuum in the chamber 8 and will, therefore, produce an upward suction in the spout 10, which, by proper adjustment of the valve 12, may be regulated so that the suction will pick up just the proper relatively light materials, such as chaff, dust and some small light seeds, and also some of the lightest oats. The wheat and oats and certain other commingled seeds and some heavy particles will then be subjected to the successive actions of the several sieves 5. The action of the sieves 5 is such that the good wheat will pass through the perforations of all thereof, close to the head of the gang, and will fall onto the so-called sand screen 34, and from thence, will be delivered from the lower end thereof of said lighter screen, while small, heavy particles, such as sand, for example, and also certain small seeds will pass through the said sieve 34. Some of the wheat will also fall onto the raised deck 38, and from thence be delivered back onto the screen 34.

To obtain the highest efficiency of the machine, the sieve should be kept well loaded with the grain, and hence, some of the good wheat, together with some of the oats, will pass through the gang of sieves 5, but will be carried beyond the raised deck 38 and onto the screen 37, and from thence, will be delivered to the inclined spout 35. The commingled incompletely separated stock, which is thus delivered to the said spout 35, requires re-cleaning, and this is accomplished, as will presently be noted. Here, however, it may be stated that the main body of oats will pass off from the lower ends of the sieves 5 and be entirely separated from the other stock.

The incompletely separated stock, by the inclined spout 35, is delivered to the lower portion of the elevator leg 39, and by the elevator belt 40, will be carried to the spout 44, and from thence, will be delivered to the so-called re-distributing spout 45 and 46 where it will be taken up by the rotary spiral conveyer $a$ and evenly distributed over the entire perforate surface of the said spout. The adjustments of the trough or spout elements 45 and 46 should be such that the perforations therein will be set to permit all or approximately all of the stock to be passed through the perforations before it is carried to the farther end of the said trough. To make sure that this re-distributed stock will be evenly delivered at all points transversely of the upper sieve 5, it may sometimes be desirable to so set the perforations of the distributing trough, that a small amount will flow from the end of the said trough, where it may be caught in any suitable receptacle and again be re-distributed. It will thus be seen that the incompletely separated stock which is re-distributed, is not returned to the feed hopper, but is independently delivered to the gang of sieves 5 at a point in advance of a point where the main stock is fed thereto.

The quantity of grain fed from the hopper 2 may be regulated by varying the inclination of the feed pan 32. The manner in which this adjustment of the feed pan can be readily accomplished has already been clearly described.

The sieve shoe 6 requires vibration at a comparatively high rate of speed and it has, as is well known, a very considerable momentum and inertia that must be overcome at the limit of its reciprocation. By yieldingly mounting the eccentric or crank shaft 48, substantially as illustrated in the drawings, the shocks which would otherwise be produced, are absorbed in the springs which support the bearings of the said shaft. The pivotal connection between the pitman head $g$ and eccentric strap $f$ permit a free unrestrained action of the eccentric and pitman, regardless of changes of the angle of the crank shaft 48, in respect to the plane of operation of the said pitman. This is highly important, because the said shaft will thus change its angle to an original position when its fiber facing 43 wears away and its diameter is therefore decreased, and also the said shaft will continuously change its angle to some extent, when the springs 54 yield to overcome the momentum of the shoe vibration.

The eccentric strap and pitman head described constitutes what may be termed a universal knuckle joint connection between the pitman and the eccentric or crank.

What I claim is:

1. In a separator of the kind described, the combination with a vibratory sieve shoe having a gang of superimposed sieves, of a re-distributing spout extending transversely over one of said sieves and having discharge passages arranged to distribute the grain evenly across the entire surface of the underlying sieve, and means receiving a portion of the stock from said gang and returning the same directly to said re-distributing spout.

2. In a separator of the kind described, the combination with a vibratory shoe having a gang of superimposed sieves, of a re-distributing spout extending transversely over one of said sieves and having in its bottom a multiplicity of discharge perforations arranged to distribute the grain evenly across the entire surface of the underlying sieve, the said re-distributing spout having an adjustable supplemental bottom section with discharge passages corresponding to the discharge passages above noted and movable to vary the effective size of said perforations, means for forcing the grain longitudinally of said re-distributing spout, and means receiving a portion of the stock from said gang and returning the same directly to said re-distributing spout.

3. In a separator of the kind described, the combination with a vibratory shoe having a gang of superimposed sieves, and means receiving a portion of the stock from said gang and delivering the same directly to one of the sieves of said gang.

4. In a separator of the kind described, the combination with a vibratory shoe having a gang of superimposed sieves, of a re-distributing device extending transversely over one of the sieves of said shoe and arranged to distribute the grain evenly across the same, and means receiving a portion of the stock from said gang and returning the same directly to said redistributing device.

In testimony whereof I affix my signature in presence of two witnesses.

THOMAS O. HELGERSON.

Witnesses:
HARRY D. KILGORE,
F. D. MERCHANT.